(12) United States Patent
Andre

(10) Patent No.: US 7,331,583 B1
(45) Date of Patent: Feb. 19, 2008

(54) WORKPIECE HOLDER WITH A MULTI-PIECE BLADDER

(75) Inventor: William M. Andre, Rochester Hills, MI (US)

(73) Assignee: Hydra-Lock Corporation, Mt. Clemens, MI (US)

( * ) Notice: Subject to any disclaimer, the term of this patent is extended or adjusted under 35 U.S.C. 154(b) by 474 days.

(21) Appl. No.: 11/020,821

(22) Filed: Dec. 22, 2004

(51) Int. Cl.
*B23B 31/30* (2006.01)

(52) U.S. Cl. .................. 279/4.03; 279/2.08; 269/22

(58) Field of Classification Search ...... 279/2.06–2.08, 279/4.03–4.05; 269/22; B23B 31/30
See application file for complete search history.

(56) References Cited

U.S. PATENT DOCUMENTS

| | | | |
|---|---|---|---|
| 2,450,800 A * | 10/1948 | Hohwart et al. ............ | 279/139 |
| 2,744,756 A | 5/1956 | Atherholt, Sr. et al. | |
| 2,797,604 A | 7/1957 | Atherholt et al. | |
| 2,829,899 A | 4/1958 | Drew et al. | |
| 2,896,954 A | 7/1959 | Ernest | |
| 3,030,120 A | 4/1962 | Atherholt, Sr. | |
| 3,335,569 A | 8/1967 | Atherholt, Sr. | |
| 3,360,276 A | 12/1967 | Peffer | |
| 3,448,988 A | 6/1969 | Athanasiou | |
| 3,497,226 A | 2/1970 | Hohwart et al. | |
| 3,637,156 A | 1/1972 | Shepherd | |
| 3,638,979 A | 2/1972 | Francois et al. | |
| 3,677,559 A | 7/1972 | Andre et al. | |
| 3,761,008 A | 9/1973 | Goulder | |
| 3,829,147 A | 8/1974 | Ryswick | |
| 3,910,098 A | 10/1975 | Tailhardat | |
| 3,999,769 A | 12/1976 | Bayer et al. | |
| 4,094,104 A | 6/1978 | Zerhafs et al. | |
| 4,189,162 A * | 2/1980 | Rasmussen et al. ....... | 279/4.06 |
| 4,284,283 A | 8/1981 | Stermann | |
| 4,422,653 A | 12/1983 | Piotrowski | |
| 4,502,703 A | 3/1985 | Rohm | |
| 4,570,950 A | 2/1986 | Morawski et al. | |
| 4,694,559 A | 9/1987 | Lundy et al. | |
| 4,724,595 A | 2/1988 | Snyder | |
| 4,811,962 A | 3/1989 | Cameron, Jr. | |
| 4,979,853 A | 12/1990 | Field | |
| 5,088,746 A | 2/1992 | Dietz et al. | |

(Continued)

FOREIGN PATENT DOCUMENTS

GB 2 025 278 1/1980

*Primary Examiner*—Monica Carter
*Assistant Examiner*—Eric A. Gates
(74) *Attorney, Agent, or Firm*—Reising, Ethington, Barnes, Kisselle, P.C.

(57) ABSTRACT

A workpiece holding apparatus comprises a body, a bladder carried by the body, and a sleeve that is carried by the bladder. A fluid chamber is at least partially defined by the body and the bladder for containing a fluid therein. The bladder comprises at least one first polymer-containing section composed of a first polymer-containing material and is adapted to radially deflect the sleeve into engagement with the workpiece. The bladder further comprises at least one second polymer-containing section disposed adjacent to the first polymer-containing section(s) and is composed of a second polymer-containing material that is less flexible than the first polymer-containing material and where at least a portion of the second polymer-containing section(s) are constructed to engage elastomeric seals of the body of the workpiece holding apparatus to thereby seal pressurized fluid within the fluid chamber.

19 Claims, 1 Drawing Sheet

U.S. PATENT DOCUMENTS

| | | |
|---|---|---|
| 5,286,042 A | 2/1994 | Laube |
| 5,516,243 A | 5/1996 | Laube |
| 5,711,538 A | 1/1998 | Retzbach et al. |
| 5,944,325 A | 8/1999 | Schmeisl |
| 6,000,687 A | 12/1999 | Andre |
| 6,015,154 A | 1/2000 | Andre et al. |
| 6,077,003 A | 6/2000 | Laube |
| 6,179,530 B1 | 1/2001 | Retzbach |
| 7,147,232 B2 * | 12/2006 | Andre, Sr. ................ 279/2.05 |
| 2003/0001345 A1 | 1/2003 | McFadden |
| 2004/0262855 A1 | 12/2004 | Andre |

* cited by examiner

WORKPIECE HOLDER WITH A MULTI-PIECE BLADDER

FIELD OF THE INVENTION

The present invention relates to machine tools and, more specifically, to a hydrostatic workpiece holder.

BACKGROUND OF THE INVENTION

Hydrostatic workpiece holders utilize hydrostatic pressure to displace a metal sleeve, which exerts a holding pressure on a workpiece. U.S. Pat. No. 6,015,154 discloses a hydrostatic holding device comprising a fluid chamber defined, at least in part, by a bladder. The bladder is composed of a single piece of plastic material and is used to separate the fluid in the chamber from the sleeve to thereby sealingly prevent the fluid in the chamber from escaping. While the device is effective and reliable as a workpiece holder, improvements are necessary to reduce leakage from the fluid chamber and to increase the overall performance and durability of the device.

SUMMARY OF THE INVENTION

The present invention provides a workpiece holding apparatus, such as a hydrostatic chuck or arbor, comprising a body, a multiple piece bladder carried by the body, and a sleeve carried by the bladder. A fluid chamber is at least partially defined by the body and the bladder for containing a fluid therein. The bladder comprises at least one first polymer-containing section composed of a first polymer-containing material and is constructed to engage the sleeve upon pressurization of the fluid in the fluid chamber to thereby radially displace the sleeve into engagement with the workpiece. The bladder further comprises at least one second polymer-containing section disposed adjacent to the first polymer-containing section and composed of a second polymer-containing material that is less flexible than the first polymer-containing material. The bladder is preferably constructed so that at least a portion of the second polymer-containing section is constructed to sealingly engage the workpiece body.

Objects, features and advantages of this invention include providing a reliable and economical workpiece holder that further reduces the extent of leakage of pressurized fluid from the fluid chamber through the sleeve of the holder, thereby permitting repeated and long-lasting use of the workpiece holder for continuous machining of various tubular and other types of workpieces.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE EMBODIMENTS

First Embodiment

Figure 1:
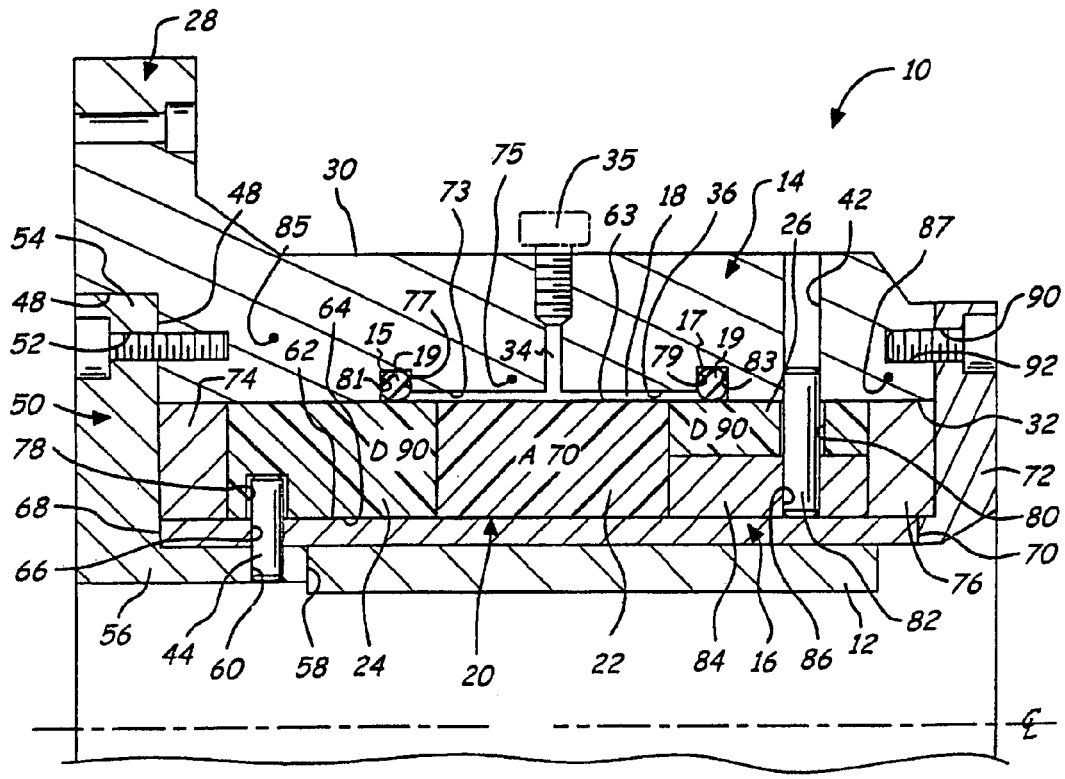
FIG. 1 is a partial cross-sectional view of a hydrostatic chuck comprising the multi-piece bladder of the present invention.

Referring in more detail to the drawings, FIG. 1 illustrates a hydrostatic part holder, and more specifically, a hydrostatic chuck 10 constructed to firmly hold and accurately locate a tubular workpiece 12 received therein, such as a cast iron cylinder sleeve for an engine. The chuck 10 includes a body 14, a tubular metal sleeve 16, a multiple piece bladder 20 carried by the body 14 and a fluid chamber 18. The body 14 comprises grooves 15, 17 that are each constructed to receive an elastomeric seal, such as an O-ring 19, for sealing engagement with the bladder 20. The bladder 20 comprises three sections; a polymeric center section 22 having two less flexible polymeric end sections 24, 26 disposed on each axial end. A fluid is received within the fluid chamber 18 and retained therein by a fluid-tight sealing arrangement formed between the end sections 24, 26 of the bladder 20 and the body 14. When the fluid in the fluid chamber 18 is pressurized, the center section 22 of the bladder 20 and portions of the end sections 24, 26 are radially displaced into inward engagement with the sleeve 16, while the end sections 24, 26 furthermore retain the seal formed between the bladder 20 and the body 14 by the O-rings 19. The metal sleeve 16 is thereby forced radially inward into firm frictional retaining engagement with the workpiece 12.

A representative workpiece 12 is a cast iron sleeve, such as a cylinder liner for an internal combustion engine. Plural workpieces formed from cast material have relatively rough surfaces and significant variations in inside and outside diameter and hence, a large displacement of the metal sleeve 16 is needed to firmly hold and accurately locate on center, one at a time, the plurality of workpieces 12 in the chuck 10 as they are machined.

The chuck body 14 of the chuck 10 includes a radially extending flange 28 constructed to be bolted to a machine spindle for co-rotation therewith as is well known in the art. The body 14 has a generally cylindrical sidewall 30 with a through bore 32 and a fluid passage 34 through which fluid is supplied to the fluid chamber 18. Preferably, as shown in phantom in FIG. 1, a threaded screw 35 received in the fluid passage 34 is rotated to control the pressure of the fluid in the fluid chamber 18. Alternatively, a pressurized fluid supply tube (not shown) communicates with the fluid passage 34 to supply fluid under pressure from an external source to the fluid chamber 18. The term "axial" or "longitudinal" refers to the direction lengthwise of a section or object, and in this invention, the centerline (C/L) of the workpiece and/or tool.

The cylindrical sidewall 30 of the chuck body 14 includes an inner surface 36 having two annular grooves 15, 17 formed therein as well as a hole 42 that is constructed to receive a portion of an interengagement feature, such as a set pin or dowel pin 44. The description and operation of the set pin 44 will be described later in more detail. The annular grooves 15, 17 are located on each outer axial end of the fluid passage 34 and each groove 15, 17 is constructed to receive an O-ring 19. When the bladder 20 is assembled within the chuck 10, the elastomeric seals 19 are compressed against the end sections 24, 26 of the bladder 20, thereby sealing the fluid chamber 18.

A counterbore 48 is formed in the body 14 and receives a stop ring 50, which is attached to the body 14 by a plurality of spaced apart bolts received through holes 52 in a radially extending flange 54. The stop ring 50 has an annular wall 56 extending into the bore 36 and constructed to provide a stop surface 58 that abuts the workpiece 12 to locate the workpiece 12 within the chuck 10. Formed into and through the stop ring 50 is a transversely-extending through slot 60 constructed to receive a portion of the set pin 44. The term "transverse" refers to any direction that intersects the axial or longitudinal direction as defined above. Alternatively, the workpiece 12 can be located by air registration or other suitable means.

The workpiece 12 is held in the chuck body 14 by the sleeve 16. The sleeve 16 may be composed of a metal such as hardened SAE 4130 or any other suitable material. The sleeve 16 includes an inner surface 62 that engages a radially interior surface 64 of the bladder 20. Formed through the sleeve 16 is a transversely-extending through slot 66 that aligns with the through slot 60 of the stop ring 50 and is constructed to receive a portion of the set pin 44. The sleeve 16 is positioned within the chuck 10 so that a first end 68 of the sleeve 16 abuts the radially extending flange 54 of the stop ring 50 and a second end 70 of the sleeve 16 abuts a nose cap 72. The nose cap 72 will be discussed further in conjunction with the discussion of the assembly of the chuck 10.

The fluid chamber 18 is defined by a gap formed between an inner cylindrical surface 73 of a radially thinner center portion 75 of the annular sidewall 30 and the radially exterior surface 63 of the bladder 20. The radially thin center portion 75 of the sidewall 30 is defined by inner annular walls 77, 79 of the grooves 15, 17 that are radially smaller than outer annular walls 81, 83 of the grooves 15, 17. The radially larger outer annular walls 81, 83 of the grooves 15, 17, thus, correspond with radially thicker end portions 85, 87 of the sidewall 30 in comparison with the thinner center portion 75. As will be discussed in conjunction with the assembly of the chuck 10, the radial thickness of the bladder 20 that is carried by the body 14 is consistent between the end section 22 and the center section 24 and is diametrically the same or just slightly smaller (in microns) than the inner diameter of the sidewall 32 at the end 85. Thus, when the chuck 10 is assembled, the end section 22 of the bladder 20 is preferably press fit within the end section 85 sidewall 30.

The bladder 20 is an annular member or the like that is incorporated within the chuck 10 between the sidewall 34 of the body 14 and the sleeve 16 and, at least partially, defines the fluid chamber 18. The bladder 20 has three alternating sections in axial or longitudinal direction; the relatively flexible, polymer-containing center section 22 disposed between the less flexible polymeric end sections 24, 26. The center section 22 is generally made of a thermoplastic, elastomeric or other flexible polymeric-material, for example polyurethane. As defined herein, the term "elastomeric" refers to a polymer-containing material that can be displaced under low stress and, upon release of that stress, will immediately return to approximately its original shape, length, and/or position. The end sections 24, 26 are preferably made of a thermoset material or other polymeric-material that is generally less flexible than the selected material of the center section 22.

Also as defined herein, the term "flexible" refers to, but is not limited to, the characteristic of a material to be displaced or bent repeatedly without, or with very little, damage to the material itself. In scientific terms, flexibility may be defined as the ratio of stress to strain in the elastic region of a stress vs. strain curve of the material, where the flexural modulus measures the material's stiffness during bending. In determining the value of the material's flexural modulus, the material is subjected to different bending loads that distribute tensile and compressive stresses through the material's cross-section. The flexural modulus is determined based on the outer fiber stress, whereas tensile modulus is based on the stress that is constant through the entire cross-section. For solid plastics, as opposed to foamed plastics, the tensile modulus generally correlates well with the flexural modulus and may be used as a substitute for characterizing the flexibility of a material where flexural modulus data is not available.

The center section 22 is an annular section of the bladder 20 composed of a relatively flexible material having a flexural modulus or a tensile modulus that is greater than that of the end sections 24, 26. The center section 22 further comprises a material preferably having a Shore A, 60 to 80 durometer hardness, more preferably a 70 durometer hardness, that exhibits suitable radial displacement characteristics for good engagement of the bladder 20 with the sleeve 16 and is preferably about 0.500 inches in axial length and about 0.250 inches in radial wall thickness. As in other instances in this patent application, these material and size preferences are merely exemplary, and the material composition and hardness and the axial length and wall thickness will vary depending on desired design parameters. Suitable materials for the center section 22 include materials composed of polyurethane, such as that available from Anderson Development of Akron, Ohio or from DuPont of Canada.

The first polymer-containing end section 24 of the bladder 20 is preferably about 0.750 inches in axial length and about 0.250 inches in radial wall thickness and is composed of a material that is less flexible than that of the center section 22 and includes a flexural modulus or a tensile modulus that is less than that of the center section 22 material. The end section 24 is further made of a material preferably having a Shore D, 80 to 100 durometer hardness, more preferably a 90 durometer hardness, such as polyurethane. The end section 24 is situated to abut a first spacer ring 74 disposed next to the radial flange 54 of the stop ring 50. A slot 78 is formed into the end section 24 and is aligned with the through slot 66 and the hole 60 of the sleeve 16 and the stop ring 50, respectively. The slot 78 is constructed so that the end section 24 is restrained from displacement in a rotational or circumferential direction, but is somewhat free to move in an axial direction. Such a configuration accommodates the normal displacement action of the bladder 20 as it axially contracts when fluid pressure is exerted on the center section 22. Otherwise, the bladder 20 would bind, thereby hindering its expected performance within the chuck 10. The pin 68 is inserted and held within the hole 60, preferably with a press fit, and extends through the slot 66 of the sleeve 16 and into the slot 70 of the end section to hold the components together. This interconnection or interengagement of these three components substantially resists and prevents the sleeve 16 and bladder 20 from twisting relative to the body 14.

The second polymer-containing end section 26 of the bladder 20 is preferably about 0.500 inches in axial length and about 0.125 inches in radial wall thickness and is composed of the same, or comparable, material as the first end section 24. The end section 26 is situated to abut a second spacer ring 76 disposed next to the nose cap 72. The end section 26 has a through slot 80 that is constructed to receive a portion of an interengagement feature, such as a set pin or dowel pin 82. Similar to that of the slot 78 of the first end section 24, the slot 80 is constructed so that the end section 26 is restrained from displacement in a rotational or circumferential direction, but is somewhat free to move in an axial direction. Again, this configuration accommodates the normal displacement action of the bladder 20 as it contracts when fluid pressure is exerted on the center section 22.

Formed into the end section 26 of the bladder 20 is an annular ring 84, preferably composed of steel, where one end of the ring 84 abuts the center section 22 of the bladder 20 and the other end, when the bladder 20 is assembled in the body 14, abuts the spacer ring 76. The ring 84 comprises a through slot 86 that is constructed to receive a portion of the set pin 82. When the pin 82 is inserted and held within the through slots 80, 86 and the hole 42, the body 14, the sleeve 16 and the bladder 20 are again held together to substantially resist and prevent the sleeve 16 and the bladder 20 from rotating circumferentially relative to the body 14.

The bladder 20 is formed by molding the three sections 22, 24, 26 together by a predetermined configuration, for example, the longer first end section 24 is molded first, followed by the center section 22 and then followed by the second shorter end section 26. This predetermined configuration of the bladder 20 may be formed by the following procedure. First, in a mixer, the relatively flexible material for the center section 22 of the bladder 20 is formed by mixing polyurethane reagent materials. The reagent materials are preferably readily available polyurethane materials that may be ordered from Anderson, DuPont, and the like by specifying a desired durometer. Second, a vacuum draw is applied to the mixture to remove air bubbles therefrom. Third, a currine catalyst is added to the mixture to promote bonding between the reagents to form the flexible-polymeric 70 durometer material. Fourth, the relatively inflexible material for the end sections 24, 26 is formed in the same way as the material for the center section 22. Specifically, polyurethane reagents are mixed in a mixer. The reagent materials are preferably readily available polyurethane materials that may be ordered from Anderson, DuPont, and the like by specifying a desired durometer. A vacuum draw is applied to remove air bubbles and then a bonding adhesive, such as Chemlok® from Lord Corporation of Cary, N.C. is applied to promote bonding. Fifth, the material for the end section 22 of the bladder 20 is poured into a pre-made, reusable inside diameter/outside diameter (ID/OD) mold (not shown) for the bladder 20. A gauge, for measuring height, such as a feeler gauge, is used to check for the desired height of the poured material. For the present invention, the height corresponds to the axial length disclosed above. For the end section 24, the height should be about 0.750 inches. Once the desired height is obtained, the material for the center section 22 is then poured into the mold. The height of the center section 22 is then checked by a height-measuring gauge. After the material for the center section 22 is poured into the mold, the ring 84 is then inserted into the mold and positioned therein. The material for the end section 26 is then poured around the ring 84 into the mold to form the thinner second end section 26 of the bladder 20. Again, the height of the end section 26 is checked by a height-measuring gauge. Sixth, the mold is put into an oven at 180° F. for about 1 hour for curing and thereafter removed and allowed to cool. At this point, the sections 22, 24, 26 are now molded together so that the mold can be removed and reused. Then the bladder 20 is placed back into the oven for a post cure operation for 17 to 20 more hours.

To assemble the chuck 10, the O-rings 19 are disposed within the annular grooves 15, 17 of the sidewall 30. The first spacer ring 74 is disposed within the bore 32 of the body 14, abutting the radial flange 54 of the stop ring 50. The bladder 20 is then coaxially forced within the bore 32 in a press fit, or an interference fit, between the end portion 85 of the sidewall 30 and a substantial portion of the end section 24 of the bladder 20 and into axial abutment with the spacer ring 74. Likewise, an interference fit is also formed between the end portion 87 of the sidewall 30 and the end section 26 of the bladder 20. The O-rings 19 received in grooves 15, 17 engage the surfaces of the end sections 24, 26 of the bladder 20 and are compressed to form fluid-tight sealing arrangements between the bladder 20 and the body 14, thereby sealing the fluid within the fluid chamber 18. The second spacer ring 76 is then disposed adjacent the end section 26 of the bladder 20. The annular nose cap 72 is attached to the chuck body 14 by bolts or screws received through holes 90 and threaded into blind bores 92 in the chuck body 14. The nose cap 72 overlaps the spacer ring 74 in the chuck body 14 and also retains the metal sleeve 16 within the chuck 10. For example, the end 70 of the sleeve 16 can be provided with castellations (not shown) that interengage castellations (not shown) in the stop ring 72. The set pin 44 is inserted into the through hole 60 in the annular wall 56 of the stop ring 50, into the through slot 66 of the sleeve 16 and into the slot 78 in the end section 24 of the bladder 20. The other set pin 82 is then inserted into the through slot 42 of the sidewall 30, into the through slot 80 of the end section 26 of the bladder 20 and into the slot 88 of the ring 84.

In use, the workpiece 12 is received within the metal sleeve 16 with one end abutting the stop surface 58 of the stop ring 50 (or located by air registration). To firmly hold and accurately locate the workpiece 12 within the chuck 10, hydraulic fluid in the chamber 18 is pressurized. The pressurized fluid produces a radial force that urges the center section 22 of the bladder 20 into engagement with the metal sleeve 16. The force acting on the metal sleeve 16 displaces or contracts the metal sleeve 16 in a radially inward direction and urges the sleeve 16 into firm and frictional engagement with the workpiece 12, thereby firmly holding and accurately locating the workpiece 12 so that its inner surface may then be machined.

Second Embodiment

Figure 2:
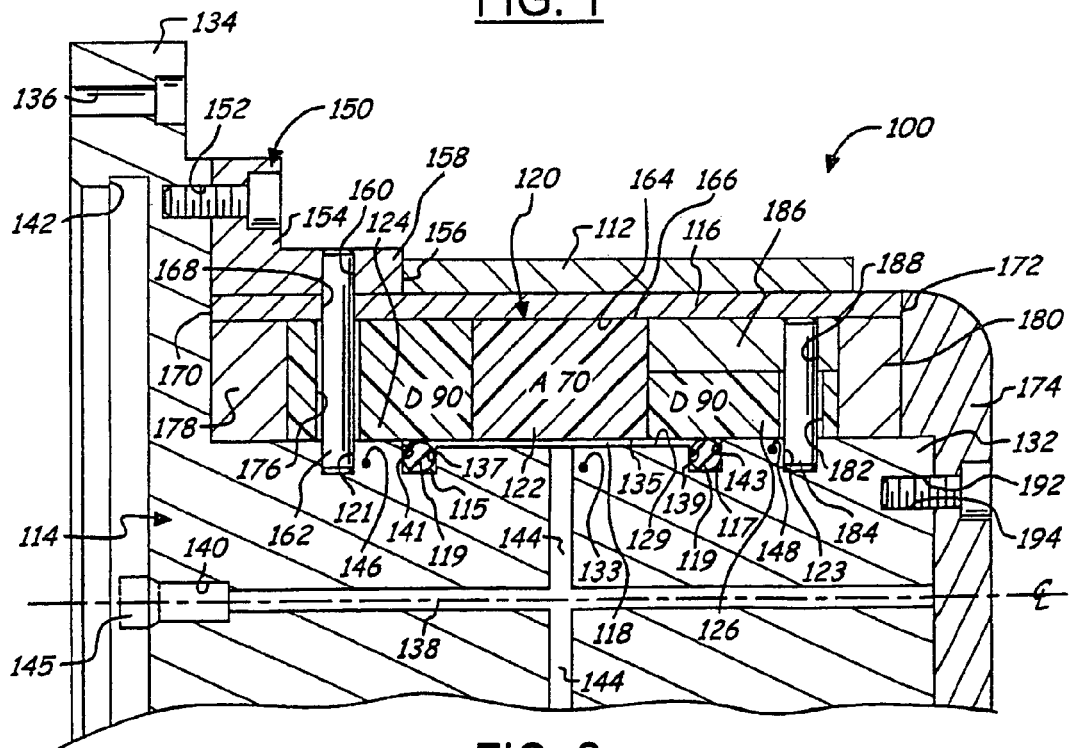
FIG. 2 is a partial cross-sectional view of a hydrostatic arbor comprising the multi-piece bladder of the present invention.

FIG. 2 illustrates a hydrostatic arbor 100 constructed to firmly hold and accurately locate a tubular workpiece 112 received thereon. The arbor 100 comprises a body 114, a tubular metal sleeve 116 and a fluid chamber 118 at least partially defined by the body 114 and a multi-piece bladder 120. The body 114 comprises grooves 115, 117 that are each constructed to receive an elastomeric seal, such as an O-ring 119, for sealing engagement with the bladder 120. Similar to the first embodiment, the bladder 120 shown in FIG. 2 comprises a polymeric center section 122 surrounded by two less flexible polymeric end sections 124, 126. A fluid is received within the fluid chamber 118 and retained therein by a fluid-tight sealing arrangement formed between the end sections 126, 128 of the bladder 120 and the body 114. When the fluid in the fluid chamber 118 is pressurized, the center section 122 and portions of the end sections 124, 126 are displace in a radially outward direction into engagement with the sleeve 116 while the end sections 124, 126 furthermore retain the seal between the bladder 120 and the body 114. The metal sleeve 116 is thereby forced into radially outward engagement with the workpiece 112.

The arbor body 114 comprises a cylindrical shaft 132 with a radially extending mounting flange 134 at one end. The grooves 115, 117 are formed into the cylindrical shaft 132 on each outer side of the branch passage 144, where each groove 115, 117 is constructed to receive an O-ring 119. The O-rings 119 seal the fluid chamber 118, which is defined by a gap formed between an inner surface 129 of a radially thinner center portion 133 of the cylindrical shaft 132 and an inner surface 135 of the bladder 120. The radially thinner center portion 133 of the cylindrical shaft 132 is formed by inner annular walls 137, 139 of the grooves 115, 117 that are radially smaller than outer annular walls 141, 143 of the grooves 115, 117. The radially larger outer annular walls 141, 143 of the grooves, 115, 117 thus correspond with radially thicker end portions 146, 148 of the cylindrical shaft 132 in comparison with the thinner center portion 133. As will be discussed in conjunction with the assembly of the arbor 100, the radial wall thickness of the bladder 120 is consistent between the end section 124 and the center section 122 and is diametrically the same or just slightly smaller (in microns) than the outer diameter of the cylindrical shaft 132 so that when the arbor 100 is assembled, the end section 124 of the bladder 120 is preferably press fit over, and thereby has an interference fit with, the cylindrical shaft 132. The cylindrical shaft 132 further comprises slots 121, 123 that are constructed to receive an interengagement feature that is constructed to interconnect or interengage the arbor body 114, the sleeve 116 and the bladder 120. Further detail regarding the interengagement feature will be provided below.

The body 114 is constructed to be mounted on a spindle of a machine tool (not shown) for co-rotation with the spindle and may be mounted on the spindle by suitable bolts or screws (not shown) received through circumferentially spaced bores 136 through the flange 134 as known in the art. The body 114 has a bore or fluid passage 138 extending into the shaft 132, a first counterbore 140 and a second counterbore 142. The fluid passage 138 is constructed to be filled with the fluid and communicates with the fluid chamber 118 by the branch passage 144 extending through the body 114 generally transversely to the fluid passage 138.

A pressurized fluid supply assembly (not shown) has one end of a supply tube (not shown) constructed to be received through the machine spindle and into the counterbore 140 in the arbor body 114 with a rotary coupling received in the spindle. The supply tube rotates with the arbor 100 in use. Alternatively, a plug or stop 145 is received in the first counterbore 140 and is removable to fill or empty the fluid from the body 114. At the opposite end of the body 114, a set screw (not shown) is threadably received in the fluid passage 138 and is displaceable to either directly pressurize the fluid in the fluid passage 138 and the fluid chamber 118 or to actuate a piston to do so. In either construction, pressurized fluid is provided to the fluid chamber 118 as desired.

An annular stop ring 150 is connected to the body 114 by a plurality of circumferentially spaced bolts or screws (not shown) received through complimentary bores 152 through a radially extending flange 154 of the stop ring 150. To locate the workpiece 112 relative to the arbor body 114, the stop ring 150 has an annular flat face 156 formed at an end of an annular wall 158 of the stop ring 150 which the workpiece 112 abuts when received on the arbor 100. The annular wall 158 includes a through hole 160 formed therein that is constructed to receive an interengagement feature, such as a set pin or dowel pin 162, which will be discussed further in more detail.

The workpiece 112 is held on the arbor body 114 by the sleeve 116. The sleeve 116 may be composed of a metal such as hardened SAE 4130 or any other suitable material. The sleeve 116 includes an inner surface 164 that engages an outer surface 166 of the bladder 120. Formed through the sleeve 116 is a through slot 168 that aligns with the through hole 160 of the stop ring 150 and is constructed to receive the set pin 162. The sleeve 116 is positioned over the arbor 100 so that a first end 170 of the sleeve 116 abuts the mounting flange 134 of the arbor body 114 and a second end 172 of the sleeve 116 abuts a nose cap 174.

The bladder 120 of the arbor 100 is substantially similar to the bladder 20 of the chuck 10 of FIG. 1 except that the bladder 120 is designed for radially outward displacement or expansion of the sleeve 116, whereas the bladder 20 is designed for radially inward displacement or contraction of the sleeve 16. As shown in FIG. 2, the bladder 120 is a cylindrical ring, member, or the like that is incorporated within the arbor 100 between arbor body 114 and the sleeve 116 and, at least partially, defines the fluid chamber 118. The bladder 120 is transversely sectioned by three alternating sections; the polymeric center section 122 disposed between the less flexible polymeric end sections 124, 126. Like materials selected for the center section 22 and the end sections 24, 26 of the first embodiment of the present invention are further incorporated and applied to like elements as disclosed in the second embodiment.

As similarly disclosed for the bladder 20 of the chuck 10, the center section 122 is an annular section of the bladder 120 that is composed of a relatively flexible material preferably having a Shore A, 60 to 80 durometer hardness, and more preferably a 70 durometer hardness, that exhibits suitable radial displacement or expansion characteristics for good engagement of the bladder 120 with the sleeve 116 and is about 0.500 inches in axial length and about 0.500 inches in radial wall thickness.

The end section 124 of the bladder 120 is about 0.750 inches in axial length and about 0.500 inches in radial wall thickness and is composed of a material that is less flexible than the center section 22, preferably with a Shore D 80 to 100 durometer hardness, and more preferably a 90 durometer hardness. The end section 124 is situated to abut a first spacer ring 178 disposed next to the mounting flange 134 of the arbor body 114. A through slot 176 is formed into the end section 124 and is aligned with the through slot 168 of the sleeve 116 and the through hole 160 of the stop ring 150. The slot 176 is constructed so that the end section 124 is restrained from displacement in a circumferential direction, but is somewhat free to move in an axial direction. Such a configuration accommodates the normal displacement action of the bladder 120 as it expands or is displaced when fluid pressure is exerted on the center section 122. Otherwise, the bladder 120 would bind up thereby hindering its expected performance on the arbor 100. When the pin 162 is inserted and held within the through hole 160 and the slots 121, 160, 168 and the hole 176, the stop ring 150, the sleeve 116 and the bladder 120 are held together. This interconnection or interengagement of these three components substantially resists and prevents the sleeve 116 and the bladder 120 from rotating circumferentially relative to the body 114.

The end section 126 of the bladder 120 is about 0.500 inches in axial length and about 0.250 inches in radial wall thickness and is composed of the same, or comparable, material as the end section 124. The end section 126 is situated to abut a second steel spacer ring 180 disposed next to the nose cap 174. The end section 126 comprises a through slot 182 that is constructed to receive an interengagement feature, such as a set pin or dowel pin 184. Similar to that of the slot 78 of the first end section 124, the slot 182 is constructed so that the pin 184 is restrained from displacement in a circumferential direction, but is somewhat free to move in an axial direction. Again, this configuration accommodates the normal displacement action of the bladder 120 as it expands or is displaced when fluid pressure is exerted on the center section 122.

The bladder 120 is formed using the same molding method described for forming the bladder 20 in the first embodiment. Like that of the first embodiment, an annular ring 186, preferably composed of steel, is formed into the end section 126 of the bladder 120, where an end of the ring 186 abuts the center section 122 of the bladder 120 and the other end, when the bladder 120 is assembled in the body 114, abuts the spacer ring 180. The ring 186 has a through slot 188 that is constructed to receive a portion of the set pin 184. As such, when the pin 184 is inserted and held within the slots 123, 182, 188 and the hole 182, the body 114, the sleeve 116 and the bladder 120 are again held together to substantially resist and prevent the sleeve 116 from rotating circumferentially relative to the end section 126 of bladder 120 and the body 114.

To assemble the arbor 100, the stop ring 150 is connected to the radial flange 134 of the arbor body 114 and the annular spacer ring 164 is disposed on the shaft 132 of the arbor body 114. Next, the bladder 120 is forced onto the shaft 132, preferably with a press fit or an interference fit, between the end portion 146 of the cylindrical shaft 132 and a substantial portion of the end section 124 of the bladder 120 and into axial abutment with the spacer ring 178. Likewise, a press fit is also preferably formed between the end portion 148 of the cylindrical shaft 132 and the end section 126 of the bladder 120. The O-rings 119 received in the grooves 115, 117 engage the surfaces of the end sections 124, 126 of the bladder 120 and are compressed to form fluid-tight sealing arrangements between the bladder 120 and the body 114, thereby sealing the fluid chamber 118. The set pin 184 is inserted into the slot 188 of the ring 186, through the hole 182 of the end section 126 of the bladder 120, and into the slot 123 of the cylindrical shaft 132. The sleeve 116 is then installed over the bladder 120 and first spacer ring 178. The second spacer ring 180 is then disposed adjacent the end section 126 of the bladder and the ring 186. The annular nose cap 174 is attached to the arbor body 114 by bolts or screws received in through holes 192 and threaded into blind bores 194 in the shaft 132. The nose cap 174 overlaps the spacer ring 180 in the body 114 and also retains the metal sleeve 116 within the arbor 100. Next, the stop ring 150 is installed over the sleeve 116 and fastened to the flange 134. Finally, the set pin 162 is inserted into the through slot 160 in the stop ring 150, into the through slot 168 of the sleeve 116 through the hole 176 in the end section 124 of the bladder 120 and into the slot 121 formed in the cylindrical shaft 132.

In use, the workpiece 112 is disposed over the metal sleeve 116 until it engages the face 156 of the stop ring 150. To firmly hold the workpiece 112 on the arbor 100, fluid under pressure is provided from an external source, such as through a supply tube, the passage 138 in the arbor body 114 and the fluid chamber 118. The pressurized fluid radially outwardly displaces the center section 122 of bladder 120, which thereby firmly engages and radially outwardly displaces or flexes the metal sleeve 116 into firm, frictional engagement with the workpiece 112 to hold and accurately locate the workpiece 112 for machining. To remove the workpiece 112 after it has been machined, the pressure of the fluid supplied to the arbor 100 is decreased by decreasing the pressure of the fluid in the fluid chamber 118, which relaxes the metal sleeve 116.

In accordance with the present invention, fluid leakage from the fluid chamber through the sleeve is reduced by providing suitable fluid-tight sealing arrangements between the multi-piece bladder and the body of all workpiece holders described herein. The press fit end sections that are less flexible than the center section of the multi-piece bladder in combination with the elastomeric seals, i.e., O-rings, incorporated therein suitably maintains the fluid-tight seal between the bladder and the body of the workpiece holder, while the center section of the multi-piece bladder can expand or contract into firm frictional engagement with the sleeve of the workpiece holder. Thus, the fluid cannot easily escape the fluid chamber when pressure is applied thereto.

While the forms of the invention herein disclosed constitute a presently preferred embodiment, many others are possible. It is not intended herein to mention all the possible equivalent forms or ramifications of the invention. It is understood that terms used herein are merely descriptive, rather than limiting, and that various changes may be made without departing from the spirit and scope of the invention as defined by the following claims.

The invention claimed is:

1. A workpiece holding apparatus comprising:
   a body;
   a bladder carried by said body, where said bladder and said body at least partially define a fluid chamber therebetween for containing a fluid therein, said bladder comprising:
      at least one first polymer-containing section composed of a first polymer-containing material;
      at least one second polymer-containing section disposed adjacent an end of said first polymer-containing section and composed of a second polymer-containing material that is less flexible than said first polymer-containing material; and
   a sleeve carried by said bladder;
   wherein said at least one first polymer-containing section of said bladder is constructed to engage said sleeve upon said fluid in said fluid chamber being pressurized.

2. The workpiece holding apparatus of claim 1 wherein said body comprises at least one fluid passage having at least one groove formed on each axial end thereof, wherein each of said at least one groove is constructed to receive an elastomeric seal for sealing engagement with said at least one second polymer-containing section to seal said fluid in said fluid chamber.

3. The workpiece holding apparatus of claim 1 wherein said first polymer-containing material of said at least one first polymer-containing section of said bladder is made of at least one of an elastomeric material and a thermoplastic material.

4. The workpiece holding apparatus of claim 1 wherein said first polymer-containing material is characterized in terms of flexibility having at least one of a tensile modulus and a flexural modulus that is larger than that of said second polymer-containing material of said at least one second polymer-containing section of said bladder.

5. The workpiece holding apparatus of claim 1 wherein said first polymer-containing material is characterized in terms of hardness having a hardness range of about 60 to about 80 durometer on the Shore A scale and is composed of a polyurethane material.

6. The workpiece holding apparatus of claim 1 wherein said second polymer-containing material of said at least one second polymer-containing section of said bladder is characterized in terms of flexibility having at least one of a flexural modulus and a tensile modulus that is less than that of said first polymer-containing material of said at least one first polymer-containing section of said bladder.

7. The workpiece holding apparatus of claim 1 wherein said second polymer-containing material is further characterized in terms of hardness in a range of between about 80 to about 100 durometer on the Shore D scale and is composed of a polyurethane material.

8. The workpiece holding apparatus of claim 1 wherein said bladder further comprises a ring carried by said at least one second polymer-containing section of said bladder.

9. The workpiece holding apparatus of claim 1 wherein when said fluid in said fluid chamber is pressurized, the force of said pressurized fluid is transmitting through said bladder to said sleeve to radially inwardly urge said sleeve into engagement with a workpiece to hold said workpiece.

10. The workpiece holding apparatus of claim 1 wherein when said fluid in said fluid chamber is pressurized, the force of said pressurized fluid is transmitted through said bladder to said sleeve to radially outwardly urge said sleeve into engagement with a workpiece to hold said workpiece.

11. A workpiece holding apparatus comprising:
    a body;
    a multiple piece bladder carried by said body, where said multiple piece bladder and said body at least partially define a fluid chamber therebetween for containing a fluid therein, said bladder comprising:
        a first polymer-containing piece composed of a first polymer-containing material; and
        second and third polymer-containing pieces each disposed on a respective opposed end of said first polymer piece, said second and third polymer pieces being composed of a material that is less flexible than said at least one first polymer-containing piece; and
    a sleeve carried by said multiple piece bladder;
    wherein said first polymer-containing piece of said multiple piece bladder is constructed to engage said sleeve upon said fluid in said fluid chamber being pressurized.

12. The workpiece holding apparatus of claim 11 wherein said first polymer-containing material of said at least one first polymer-containing piece of said bladder is made of at least one of an elastomeric material and a thermoplastic material.

13. The workpiece holding apparatus of claim 11 wherein said first polymer-containing material is characterized in terms of flexibility having at least one of a tensile modulus and a flexural modulus that is larger than that of said second material of said second polymer-containing piece of said bladder.

14. The workpiece holding apparatus of claim 11 wherein said first polymer-containing material is characterized in terms of hardness having a hardness range of about 60 to about 80 durometer on the Shore A scale and is composed of a polyurethane material.

15. The workpiece holding apparatus of claim 11 wherein said second material of said second and third polymer-containing pieces of said bladder is characterized in terms of flexibility as having at least one of a flexural modulus and a tensile modulus that is less than that of said first polymer-containing material of said first polymer-containing piece of said bladder.

16. The workpiece holding apparatus of claim 11 wherein said second material has a hardness in a range of between about 80 to about 100 durometer on the Shore D scale and is composed of a polyurethane material.

17. The workpiece holding apparatus of claim 11 wherein said bladder is formed by molding said first polymer-containing piece and said second polymer-containing piece in a mold of a predetermined configuration.

18. The workpiece holding apparatus of claim 17 wherein said bladder further comprises a ring carried by one of said second and third polymer-containing pieces of said bladder, said ring having at least one slot formed therein that aligns with at least one slot of said bladder for receiving an interengagement feature.

19. The workpiece holding apparatus of claim 17 wherein said bladder is formed by molding said first polymer-containing piece, said one of said second and third polymer-containing pieces and said ring in a mold of a predetermined configuration.

* * * * *